United States Patent [19]

Blankenship et al.

[11] Patent Number: 5,228,267
[45] Date of Patent: Jul. 20, 1993

[54] METHOD AND APPARATUS FOR MAKING FROZEN DESSERT CONES WITH ATTACHED REMOVABLE SANITARY JACKETS

[75] Inventors: R. Carl Blankenship, Sykesville; Kenneth H. Kuykendall, Sr., Westminster; Robert D. Heckner, Fallston; Kenneth L. Schultz, Baltimore, all of Md.

[73] Assignee: Sweetheart Cup Company Inc., Owings Mills, Md.

[21] Appl. No.: 707,077

[22] Filed: May 29, 1991

[51] Int. Cl.⁵ .................. B65B 11/00; B65B 35/54; B65B 35/56; B65B 61/20
[52] U.S. Cl. ..................... 53/397; 53/127; 53/157; 53/142; 53/143; 53/440; 53/445; 53/580; 198/418.2; 198/418.3; 198/493; 426/132; 426/139; 426/391; 426/420; 426/497
[58] Field of Search .............. 198/418.2, 418.3, 493; 426/132, 139, 391, 420, 497; 53/111 R, 113, 127, 142, 143, 156, 157, 397, 428, 440, 580, 581, 585, 594, 535, 445, 202

[56] References Cited

U.S. PATENT DOCUMENTS

| | | |
|---|---|---|
| 1,403,771 | 1/1922 | Hamer . |
| 1,436,754 | 11/1922 | Chadwick . |
| 1,599,267 | 9/1926 | Amos . |
| 1,638,795 | 8/1927 | Bentley ..................... 53/440 X |
| 1,771,765 | 7/1930 | Benson . |
| 1,800,759 | 4/1931 | Shean . |
| 1,854,091 | 4/1932 | Young . |
| 1,885,142 | 11/1932 | Reece et al. .................... 53/440 X |
| 2,150,207 | 3/1939 | Currie . |
| 2,228,942 | 1/1941 | Balton . |
| 2,303,420 | 12/1942 | Amberg et al. .................... 53/397 |
| 2,371,668 | 3/1945 | Balton .................... 53/585 |
| 2,445,713 | 7/1948 | Glassner .................... 53/585 |
| 2,557,602 | 6/1951 | Huitt et al. . |
| 2,666,310 | 1/1954 | Hill . |
| 2,948,452 | 8/1960 | Grogan et al. . |
| 2,965,499 | 12/1960 | Wise . |
| 3,753,484 | 8/1973 | Aiuola et al. .................... 198/493 X |
| 3,944,048 | 3/1976 | Grishaev et al. .................... 198/493 X |
| 4,069,996 | 1/1978 | Koziol . |
| 4,104,405 | 8/1978 | Forkner . |
| 4,136,800 | 1/1979 | Christner et al. . |
| 4,180,153 | 12/1979 | Krishman et al. .................... 198/493 X |
| 4,232,798 | 11/1980 | Hammel et al. . |
| 4,241,847 | 12/1980 | Lancia et al. . |
| 4,289,791 | 9/1981 | Weinstein .................... 426/139 |
| 4,290,573 | 9/1981 | Shapiro . |
| 4,313,965 | 2/1982 | Weinstein .................... 426/139 |
| 4,498,273 | 2/1985 | Colamussi .................... 53/142 X |
| 4,529,470 | 7/1985 | Weinstein . |
| 4,608,808 | 9/1986 | Ryan et al. .................... 53/535 X |
| 4,720,037 | 1/1988 | Alpert . |
| 4,821,906 | 4/1989 | Clark . |
| 4,855,150 | 8/1989 | Mathes et al. . |
| 5,012,628 | 5/1991 | Van Oord .................... 53/535 X |

Primary Examiner—John Sipos
Assistant Examiner—Linda B. Johnson
Attorney, Agent, or Firm—Nixon & Vanderhye

[57] ABSTRACT

Frozen dessert cones made from a cooked batter capable of having lower and higher moisture contents, which respectively cause the cone to assume dimensionally contracted and expanded states, are provided with sanitary jackets while in their dimensionally contracted state. When the cooked batter forming the cone attains a higher moisture content, the cone will dimensionally expand against the walls of the sanitary jacket thereby exerting a restraining force against removal of the jacket from the cone. The sanitary jacket is applied to an interior handle region of a cone so that the sanitary jacket will nest with the exterior surface of a downstream cone handle when stacked therewithin. A chute is provided so as to align and direct the sanitary jacket with respect to the interior handle region of the cone. A stream of pressurized fluid (e.g., air) is then preferably directed against the sanitary jacket so as to propel the same into a seated relationship with the interior handle region.

20 Claims, 6 Drawing Sheets

METHOD AND APPARATUS FOR MAKING FROZEN DESSERT CONES WITH ATTACHED REMOVABLE SANITARY JACKETS

FIELD OF INVENTION

The present invention generally relates to edible cones used to hold frozen desserts (e.g., ice cream, frozen yogurt, and the like). More specifically, the present invention relates to frozen dessert cones having removable jackets placed upon the cone handles so as to provide a measure of sanitary protection, and to methods and apparatus of making the same.

BACKGROUND AND SUMMARY OF THE INVENTION

Frozen desserts are typically dispensed from bulk containers in so-called "scoops" which are then placed in the open ends of edible cone-shaped containers more typically referred to as "dessert cones". These dessert cones are typically supplied to points of retail sales (e.g., frozen dessert parlors, vendors, restaurants, etcetera) in a stacked configuration—that is, with the cone handles being nested within the interior of a subjacent cone. The bottommost dessert cones in the stack are then usually manually grasped by the handle and removed from the stack when a frozen dessert order has been placed.

The dessert cones are, of course, grasped by their handles when the frozen dessert order is being filled by the retailer, as well as during consumption of the frozen dessert by the customer. In addition, it may be necessary for the dessert cone to be placed temporarily in a holding device prior to sale, for example, to allow the retailer to fill other orders and/or to allow the retailer and the customer to exchange money in payment for the frozen desserts. Therefore, it is and has been desirable to provide a jacket on the exterior of the cone handle so that direct contact with the cone itself is avoided thereby providing a measure of sanitary protection. The jacket may then be removed by the customer as the frozen dessert and cone are consumed.

Sanitary jackets for frozen dessert cones are, in and of themselves, well known. However, one problem associated with sanitary jackets is that they may prematurely and/or inadvertently be removed from the cone handle which defeats their intended purpose of providing sanitary protection during the dispensation and consumption of the frozen dessert. Several proposals have therefore been made to ensure that the sanitary jackets remain in place on the cone handle until they are intentionally removed. In this connection, ribs and/or gripping claws have been formed on the sanitary jackets so as to increase the friction fit with the exterior surface of the cone handle, as disclosed in U.S. Pat. No. 4,136,800 issued to Christner et al. In addition, potable "adhesive" solutions have been applied to the interior sanitary jacket surfaces and/or the exterior handle surfaces of frozen dessert cones so as to ensure that a tight-fitting relationship exists between the sanitary jacket and the cone handle, as evidenced, for example, by U.S. Pat. Nos. 4,289,791, 4,313,965 and 4,529,470, each being issued to Weinstein.

As can be appreciated, these prior art proposals necessarily increase the complexity of the processing and-/or packaging environment since either especially configured sanitary jackets (e.g., with ribs and/or gripping claws) must be employed, and/or a process step (e.g., application of a potable "adhesive") in addition to the step of mating the jacket to the cone handle must be performed. On a mass production scale, these added complexities can significantly affect the production costs. Perhaps more importantly, however, none of the prior art proposals have truly been satisfactory on a large-scale commercial basis. This is especially true with so-called "flat-bottom" cones which have posed particular problems to cone manufacturers due to the presence of a bottom wall on the cone handle which tends to cause air to be trapped between it and the bottom jacket wall thereby, in turn, preventing a "snug" fit between the jacket and cone handle. It is towards eliminating the problems associated with prior proposals for jacketed cones and fulfilling needs in this art that the present invention is directed.

According to the present invention, novel jacketed frozen dessert cones are provided along with equally novel apparatus and methods of making the same. The frozen dessert cones of this invention are formed of an edible cooked batter capable of having lower and higher moisture contents which respectively causes the cone to assume dimensionally contracted and expanded states. A sanitary jacket which is preferably formed of food-grade paper (but also could be formed of aluminum foil or self-supporting plastics film material or the like) is preapplied to the handle of the cone while it is in its dimensionally contracted state. The jacket will thus relatively easily slip onto the cone handle with a slight clearance space therebetween. This clearance space is especially important when the invention is embodied in jacketed flat-bottom cones, as it provides a convenient vent path which precludes air from being trapped between the jacket and the cone.

The contracted dimension of the cooked batter is typically at a minimum upon being discharged from the cooking oven. That is, due to the elevated temperatures employed in the cooking oven, the moisture content of the cones will be at (or at least very close to) a minimum when the cones are discharged from the oven after the cooking cycle has been completed. The cones will similarly be at an elevated temperature when discharged from the cooking oven and will be allowed to thereafter cool to ambient conditions. The sanitary jackets are, according to the present invention, placed upon the cone handles (either manually or, more preferably, by automated apparatus according to another aspect of this invention to be described below) when the cooked batter is in its dimensionally contracted state.

The cooked batter forming the cones will naturally regain from the ambient environment some of the moisture that was lost during the cooking process and, as a result, will dimensionally expand. Since the sanitary jackets had been preapplied to the cone handles while in a dimensionally contracted state, this dimensional expansion will result in a disappearance of the small clearance space between the jacket and the cone handle that had existed previously. In addition, dimensional expansion of the cone will cause a substantially uniform radially outwardly directed pressure to be exerted against the side walls of the sanitary jacket. The radial pressure that is exerted by means of the cooled and dimensionally expanded cone will thereby maintain the jacket in a tight, non-slip fit with the cone handle without necessarily providing the jacket with a potable "adhesive" and/or gripping claws.

The sanitary jackets during production are removed one-by-one from a supply stack (e.g., by suitable stripping mechanisms) and are directed by means of a chute towards the interior handle cavity of an awaiting cone. The sanitary jackets are then forcibly discharged from the chute (e.g., by means of pressurized air) so as to be seated reliably within the interior handle cavity of the awaiting cone. When the handle of the next upstream cone is stacked (mated) within the interior handle cavity of the relatively adjacent downstream cone in which the jacket has been placed, the jacket will necessarily be seated onto the exterior handle portion of the upstream cone (i.e., since a slight clearance space between the jacket and the exterior cone handle is provided when the cones are in a dimensionally contracted state as briefly described above). Thus, upon cooling and regaining moisture content, the cone will dimensionally expand as briefly described above so that when the upstream and downstream cones are separated, the jacket will remain on the handle of the upstream cone. The process according to the present invention is thus conducive to automated placement of the jackets in a production line in which the cones are presented sequentially to a jacketing station in an in-line manner.

Further advantages and aspects of this invention will become more clear after careful consideration is given to the following detailed description of the preferred exemplary embodiments.

BRIEF DESCRIPTION OF THE ACCOMPANYING DRAWINGS

Reference will hereinafter be made to the accompanying drawings wherein like reference numerals throughout the various figures denote like structural elements, and wherein.

DETAILED DESCRIPTION OF THE PREFERRED EXEMPLARY EMBODIMENTS

Figure 1:
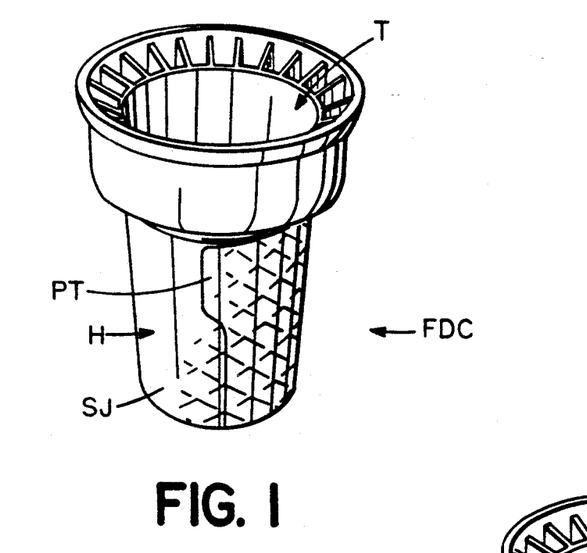
FIG. 1 is a perspective view of an especially preferred embodiment of a jacketed frozen dessert cone according to the present invention.
Figure 2:
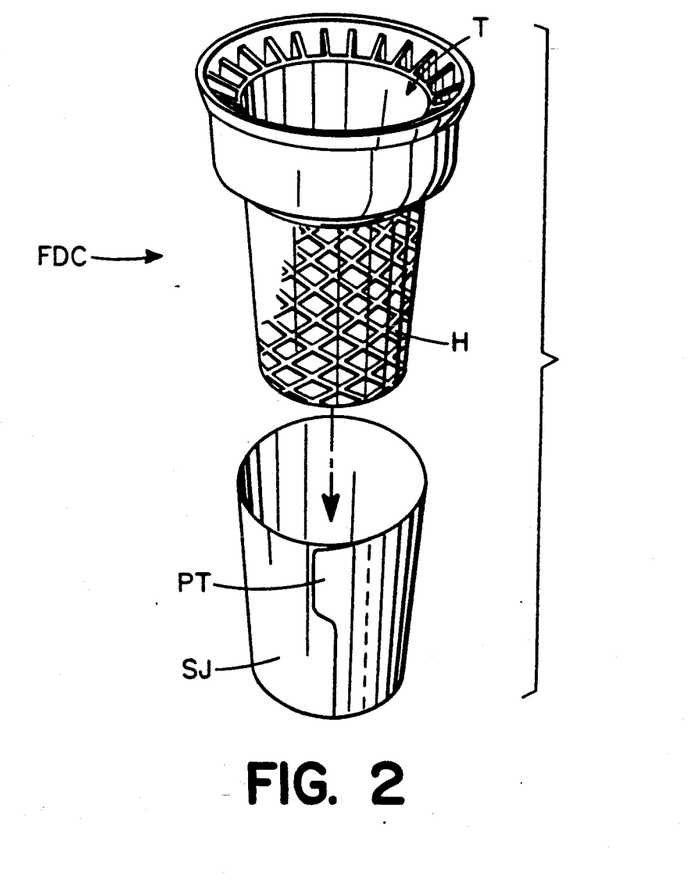
FIG. 2 is a perspective view of a frozen dessert cone similar to FIG. 1 but depicted with the sanitary jacket removed therefrom.

A preferred frozen desert cone FDC according to the present invention is shown in accompanying FIGS. 1 and 2. In this regard, the frozen dessert cone FDC shown in FIG. 1 is depicted as having the sanitary jacket SJ in place on the cone handle H, whereas the frozen dessert cone FDC shown in FIG. 2 is depicted as having the sanitary jacket removed therefrom for clarity of presentation. The frozen dessert cones FDC shown in FIGS. 1 and 2 are commonly referred to as "flat bottom" cones due to the handle terminating in a flat bottom wall. As is conventional, the frozen dessert cones FDC will have an open top T adapted to providing a receptacle for frozen desserts.

The frozen dessert cones FDC according to the present invention will be provided in the form shown in FIG. 1—that is, with the cone handle H securely nested within the sanitary jacket SJ. As is shown, the sanitary jacket SJ is sized and configured to closely match the geometries of the cone handle H, which in the particular embodiment shown in FIGS. 1 and 2 just happens to be a flat bottom cone. The sanitary jacket SJ will also be provided with an integral pull tab PT so that when a frozen dessert is served to the ultimate consumer, the sanitary jacket SJ may be peeled away from the cone handle H as needed to allow both the frozen dessert and the cone FDC to be consumed.

Figure 3:
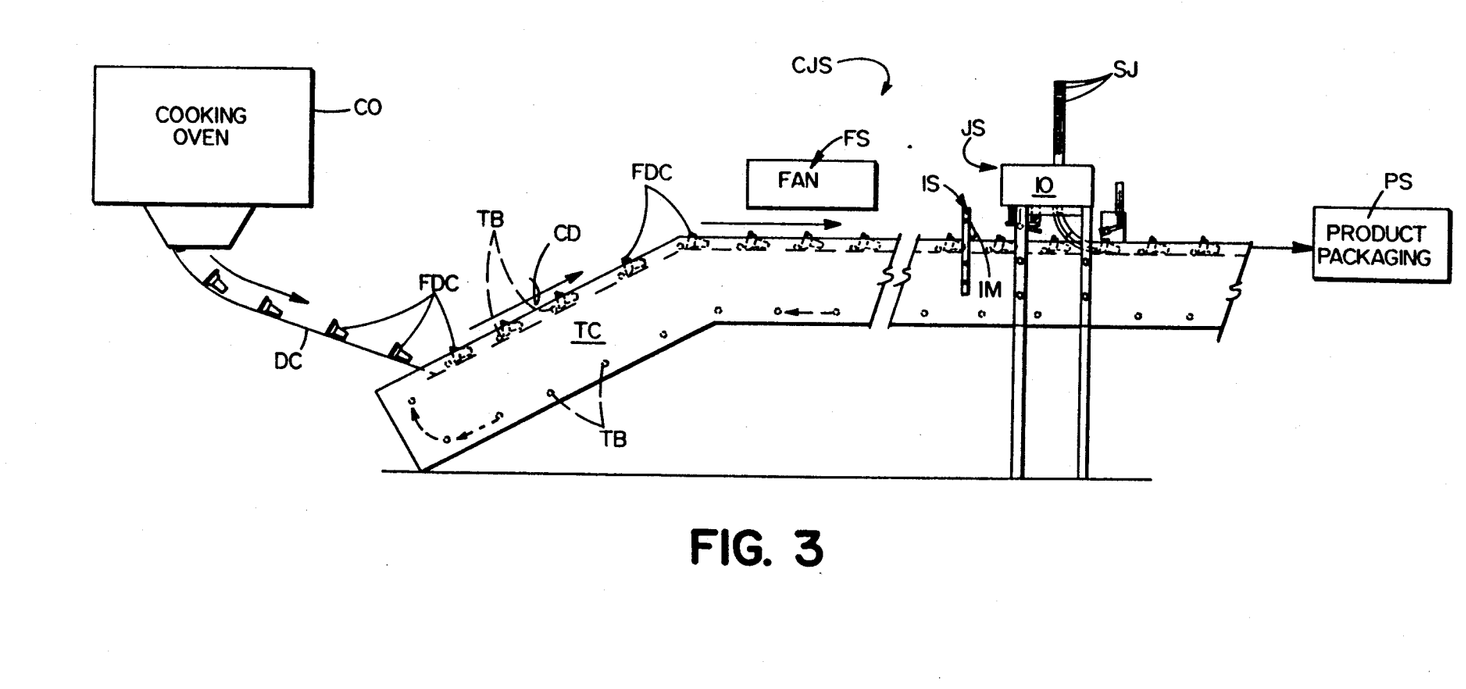
FIG. 3 is a schematic view of the processing steps according to the present invention employed to make the jacketed cone shown in FIG. 1.

A schematic elevational view of a preferred cone-jacketing system CJS is shown in accompanying FIG. 3. As is seen, the system 10 is generally comprised of an automated cooking oven CO, a transfer conveyor TC which conveys the frozen dessert cones FDC past an automated jacketing station JS and on to a packaging station PS. A cooling fan may be interposed at an optional fan cooling station FS along the path traversed by the transfer conveyor TC upstream of the jacketing station JS. In this connection, the optional fan cooling station FS can be provided so as to direct an air stream against the frozen dessert cones FDC and thereby reduce their temperature prior to entering the jacketing station JS.

As is well known in and of itself, the cooking oven CO includes cone molds (not shown) which hold raw batter in conformance to the desired frozen dessert cone configuration. Thus, when the molds are opened after completion of the batter cooking cycle, the cooked batter in the form of self-supporting frozen dessert cones FDC will be discharged from the cooking oven CO. Usually, a number of frozen desert cones are discharged simultaneously from the cooking oven CO and thus the representation in FIG. 3 of only single frozen dessert cones FDC being discharged is merely for clarity of presentation. The frozen desert cones FDC are directed to the transfer conveyor TC by means of a discharge chute DC or like structures.

The transfer conveyor TC preferably has a number of transfer bars TB which extend transversely to the conveyor's conveyance direction (arrow CD in FIG. 3). The frozen dessert cones FDC are typically discharged from the cooking oven CO and will be directed to the transfer conveyor in a handle-first orientation. Thus, the transfer bars TB will eventually come into contact with the edge which defines the open top ends T of a respective series of frozen desert cones FDC and thereby convey the cones in a handle-first orientation as shown.

Sometimes, however, the orientation of the cones FDC will be reversed. That is, some cones may be conveyed along the transfer conveyor in a handle-last orientation (i.e., with the handle of the cone facing rearwardly relative to the conveyance direction CD). These incorrectly oriented cones will therefore pass an inversion station IS provided a pivotal inverter mechanism IM which serves to contact the open end of the incorrectly oriented frozen dessert cones FDC and invert them on the conveyor so that the cones will thereafter be oriented correctly (i.e., in a handle-first orientation) prior to passage through the jacketing station JS.

The jacketing station JS includes an automated jacketing apparatus 10 according to the present invention to be described in greater detail below. Suffice it to say here that the jacketing apparatus 10 serves to place sanitary jackets SJ onto the handle of the frozen dessert cones FDC. The jacketed frozen dessert cones FDC may thus be transferred to a product packaging station PS for shipment to customers and/or points of use.

Figure 4:
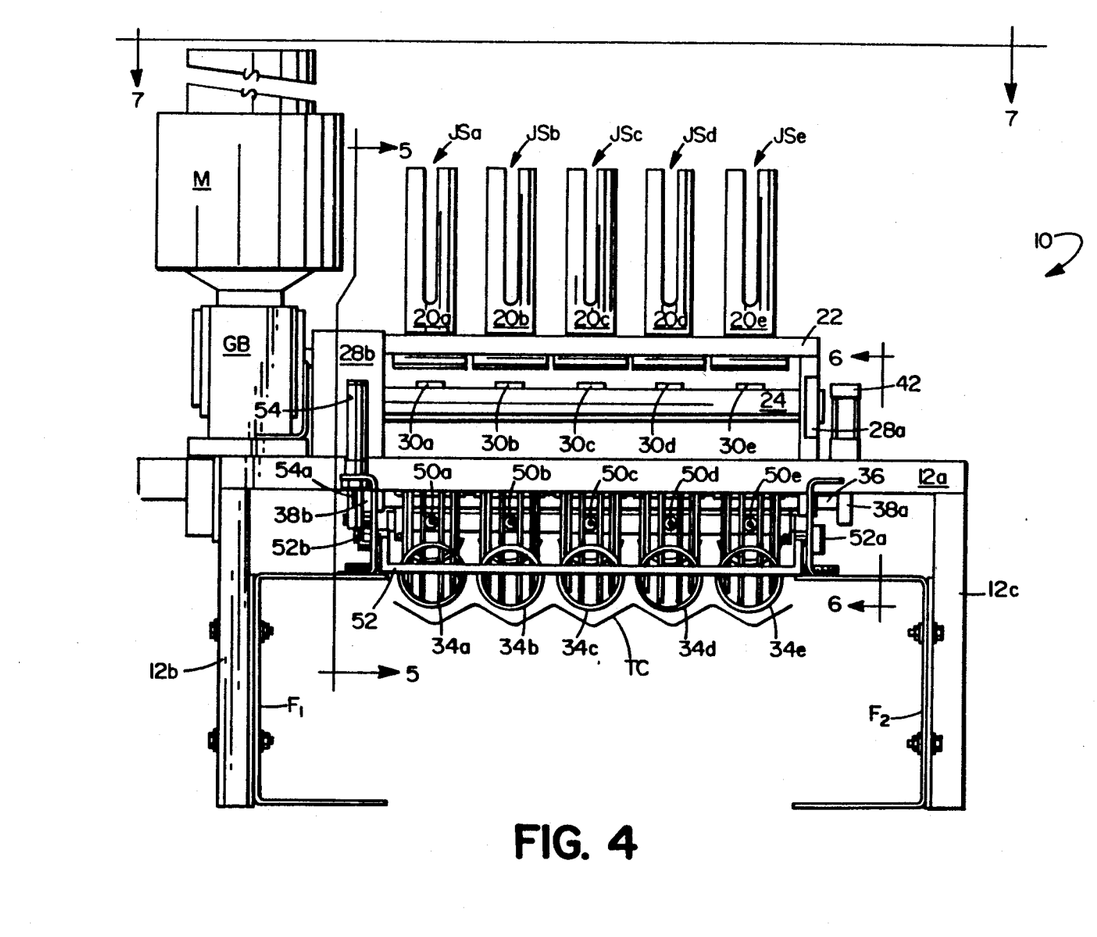
FIG. 4 is a front elevational view of the cone-jacketing apparatus according to this invention.
Figure 5:
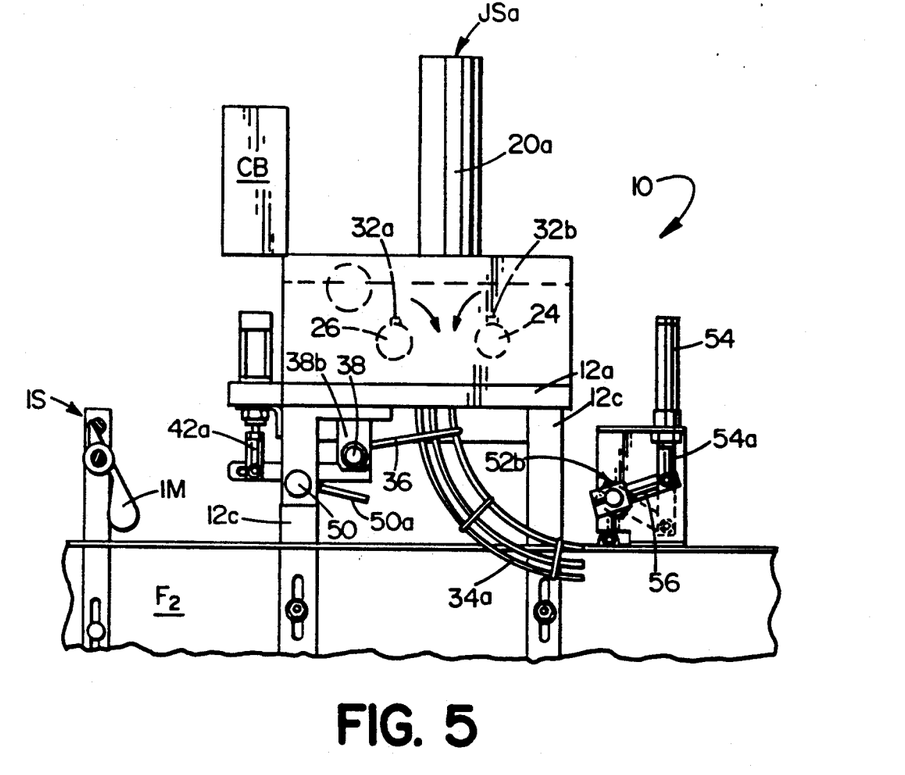
FIG. 5 is a right side elevational view of the cone-jacketing apparatus shown in FIG. 4 as taken along line 5—5 therein.
Figure 6:
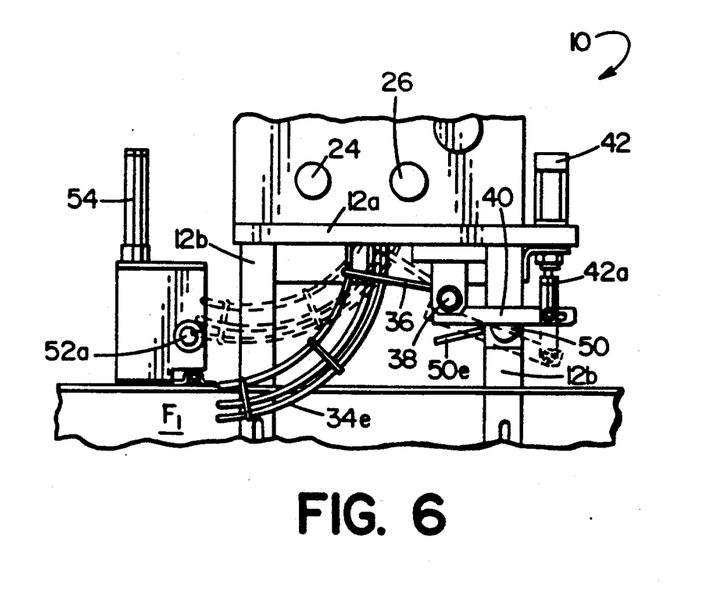
FIG. 6 is a left side elevational view of the cone-jacketing apparatus shown in FIG. 4 as taken along line 6—6 therein.
Figure 7:
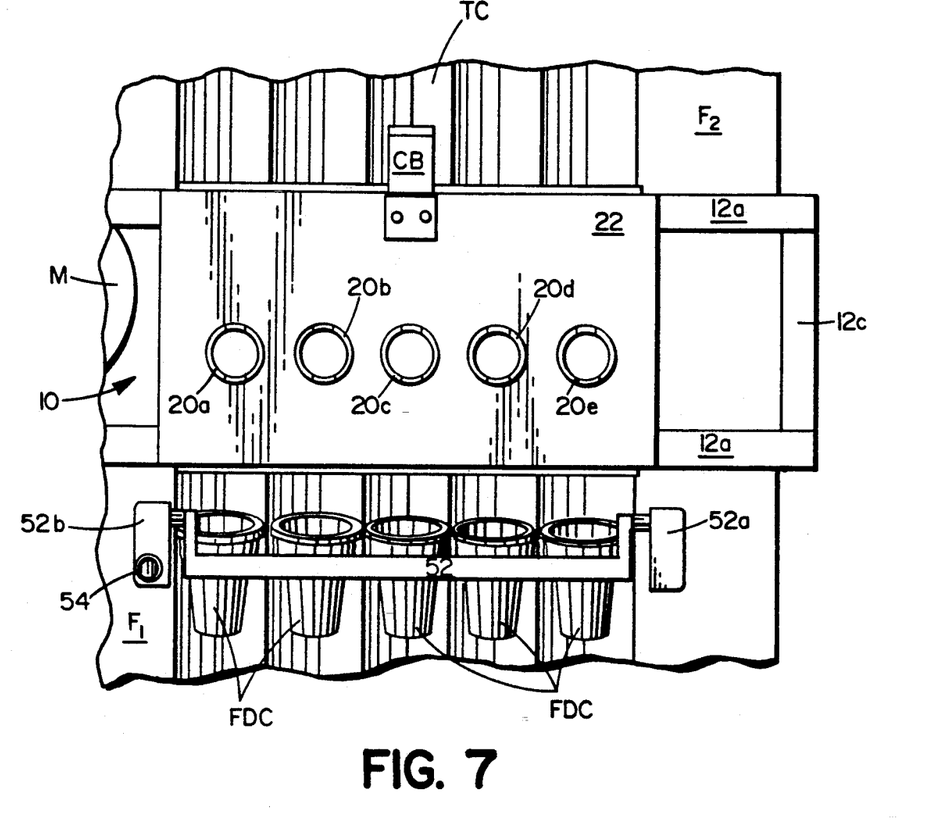
FIG. 7 is a top plan view of the cone-jacketing apparatus shown in FIG. 4 as taken along line 7—7 therein.

An especially preferred jacketing apparatus 10 is shown in accompanying FIGS. 4-7. The jacketing apparatus 10 is supported vertically above the transfer conveyor TC by a framing structure which includes a horizontal support plate 12a rigidly coupled to lateral pairs of upright support legs 12b, 12c. As is seen in FIGS. 4-6, the support legs 12b, 12c are rigidly connected (e.g., via bolts) to the lateral frame members F1, F2, respectively, associated with the transfer conveyor TC.

The jacketing apparatus 10 shown in the accompanying figures is especially adapted to provide sanitary jackets SJ (not shown in FIGS. 4-7, but see FIG. 3) simultaneously to a row of five (5) frozen dessert cones. In this connection, the individual frozen dessert cones FDC will be positioned within a respective one of the troughs of the transfer conveyor TC so as to be conveyed past a respective one of the jacketing stations JSa-JSe associated with the jacketing apparatus 10. Thus, in the preferred embodiment shown, five (5) individual jacketing stations JSa-JSe are provided so as to simultaneously supply and mate the sanitary jackets SJ onto the handles of the frozen dessert cones FDC. Of course, greater/lesser numbers of jacketing stations JS could be provided in dependence upon the production rate that is needed or desired, for example.

The jacketing stations JSa-JSe each include an upright tubular jacket holder 20a-20e fixed to and extending upwardly from an upper support member 22. Each of the tubular jacket holders 20a-20e is adapted to hold an upright stack of cup-shaped (i.e., when applied to flat bottom cones) sanitary jackets SJ (see FIG. 3). In this regard, the sanitary jackets will themselves be stacked "right-side up"—that is, the open upper ends of the sanitary jackets SJ will be oriented above the bottom wall of the jackets such that the jackets are nested in stacked relationship with one another.

The bottommost sanitary jacket SJ in the stack will be stripped off by means of a pair of strip rollers 24, 26 journalled at their respective ends to upright bearing supports 28a, 28b and counter-rotated in the direction of the arrows in FIG. 5 by means of a motor M/gear box assembly GB (see FIG. 4). The counter-rotatable strip rollers 24, 26 respectively carry friction members 30a-30e and 32a-32e which are, in turn, respectively aligned with one of the tubular sanitary jacket holders 20a-20e. It will be appreciated that although only a single one of the friction members 32a is shown in FIG. 5 as being in opposition to friction member 30a, the other friction members 32b-32c are aligned along the strip roller 26 in opposite alignment with a respective one of the friction members 30b-30e.

By virtue of the counter-rotation of the strip rollers 24, 26, the friction members 30a-30e and the 32a-32e will contact the bottommost sanitary jacket SJ in the stack held within each of the tubular jacket holders 20a-20e. That is, the bottommost sanitary jacket SJ will be stripped off the end of the sanitary jacket stack each time the friction members 30a-30e and 32a-32e make a complete revolution. The sanitary jackets SJ will therefore be supplied sequentially one-by-one to an inlet end of a respective guide chute 34a-34e. The sanitary jackets SJ are thus transferred via the guide chute 34a-34e to a position close to the upper surface of the transfer conveyor TC.

Each of the guide chutes 34a-34e is rigidly fixed to a distal end of a tie rod 36. The proximal end of the tie rod 36 is, in turn, rigidly fixed to an axle 38 journally held at each of its ends by means of bearing blocks 38a, 38b. An actuator arm 40 is coupled operatively between the axle 38 and the piston rod 42a of an air cylinder actuator 42. Reciprocal rectilinear movements of the piston rod 42a will thereby vertically displace the actuator arm 40 which, in turn, causes the axle 38 to rotate. The guide chutes 34a-34e are thus capable of being pivoted collectively between a lowered position (shown by solid line in FIG. 6) and a raised position (shown by phantom line in FIG. 6) in response to pivotal movements of the axle 38 controlled by means of the air cylinder actuator 42.

An air header 50 extends transversely across the width of the transfer conveyor TC and is positioned upstream (rearwardly) of the guide chutes. The air header 50 is coupled operatively to a source of pressurized air (not shown) so as to supply the same to nozzles 50a-50e aligned with respective ones of the guide chutes 34a-34e. The nozzles 50a-50e are oriented in a direction so as to direct a stream of pressurized air generally centrally of the discharge end of the guide chutes 34a-34e, respectively, when in their lowered position to thereby assist in the discharge of respective sanitary jackets therefrom and into an awaiting frozen dessert cone FDC.

The stream of pressurized air from the nozzles 50a-50e will also serve to propel the frozen dessert cones along the upper surface of the transfer conveyor TC to a precise downstream location established by means of a transversely extending (i.e., relative to the transfer conveyor TC) stop bar 52. In this regard, the stop bar 52 is journally supported at each of its ends by bearing blocks 52a, 52b so as to be capable of pivotal movements between inoperative and operative positions. The stop bar 52 is coupled to a piston rod 54a of an air cylinder actuator 54 by means of an actuator arm 56. Thus, controlled reciprocal rectilinear movements of the piston rod 54a will responsively cause the stop bar 52 to pivot between its inoperative and operative positions due to the vertical displacement of the actuator arm 56 (i.e., as shown in phantom line in FIG. 5).

While in its inoperative and operative positions, the stop bar 52 is vertically spaced greater and lesser dimensions, respectively, relative to the transfer conveyor TC. When in its operative position, therefore, the stop bar 52 serves to present an obstacle to continued conveyance of the frozen dessert cones FDC along the transfer conveyor TC and thereby provides definitive positioning of the cones FDC relative to the discharge end of the respective guide chutes 34—34 as shown more clearly in FIG. 4. On the other hand, when in its inoperative position, the stop bar 52 is vertically raised relative to the upper surface of the transfer conveyor TC thereby allowing the frozen dessert cones FDC to pass therebelow to a downstream location.

FIGS. 8a-8e show in schematic fashion a cycle of operation for the jacketing apparatus 10 described previously. In this regard, only a single jacketing station JSa has been shown, but it will be appreciated that simultaneous functions occur at all jacketing stations JSa-JSe associated with the apparatus 10.

Figure 8A:
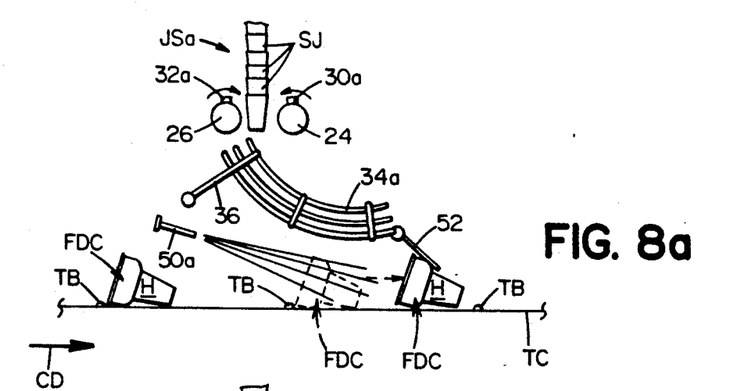
FIGS. 8a–8d show sequential states during an exemplary operational cycle of the cone-jacketing apparatus according to the present invention.

Referring first to FIG. 8a, an operational state is depicted whereby a controlled air stream burst has been discharged from a nozzle 50a so as to propel the frozen dessert cone FDC forwardly relative to the direction of conveyance CD. The forward movement of the frozen dessert cone FDC is arrested by the stop bar 52 which will have just previously been moved into its operative position by means of a command signal being issued by control circuitry contained in the control box CB (see FIG. 5) to actuate the air cylinder actuator 54 (see FIGS. 4-7).

It will be appreciated that the transfer conveyor TC moves at a relatively constant speed. That is, when propelled forwardly by the air stream burst from nozzle 52, the cone will be moved in advance of its transfer bar TB which served to convey the frozen dessert cone from the discharge chute DC associated with the cooking oven CO to the jacketing station JS (see FIG. 3). Thus, the transfer bar TB will continue to be moved towards the momentarily stationary frozen dessert cone FDC (i.e., due to its abutment against the stop bar 52).

Figure 8B:
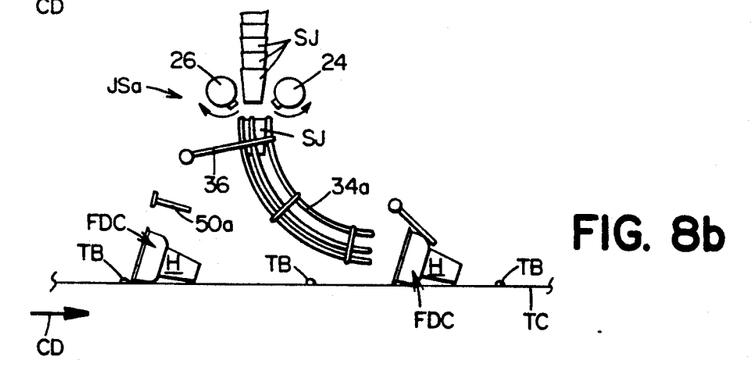

It will also be observed in FIG. 8a that the strip rollers 24, 26 will be in a position where contact between the friction members 30a, 32a and the bottommost sanitary jacket SJ in the stack held by jacket holder 20a will soon occur. As is shown in FIG. 8b, the strip rollers 24, 26 have now rotated sufficiently such that the friction members 30a, 32a have contacted the bottommost sanitary jacket SJ in the stack causing it to be stripped therefrom and fall under its own weight into the inlet end of the guide chute 34a. Prior to stripping of the bottommost sanitary jacket SJ in the stack, however, the guide chute 34a will have been moved from its raised position (e.g., as shown in FIG. 8a) to its lowered position (e.g., as shown in FIG. 8b) by means of a command signal being issued by the control box CB to operate the air cylinder 42.

Figure 8C:
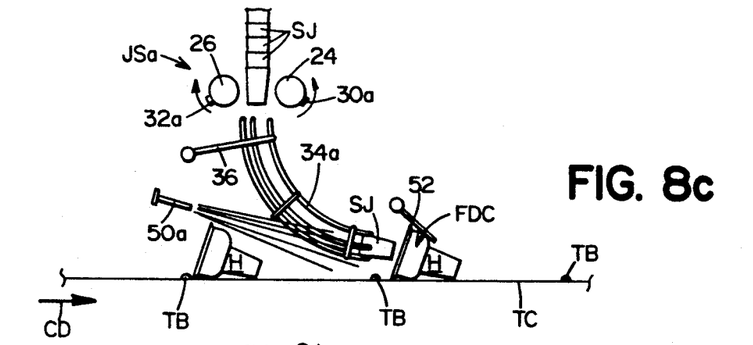
Figure 8D:
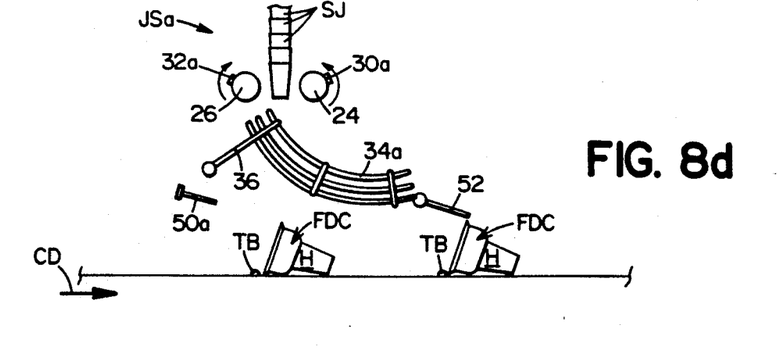

The sanitary jacket SJ falls under its own weight and is guided by the guide chute 34a so as to be in general coaxial alignment with the open end of the frozen dessert cone FDC positioned immediately adjacent thereto as is shown in FIG. 8c. At this time, the control box CB issues a command signal to allow an air stream burst of predetermined duration to be discharged from the nozzle 50a. This second air stream burst from nozzle 50a thereby forcibly propels the sanitary jacket SJ forwardly into the hollow interior of the handle H of the frozen dessert cone FDC being held stationary by the stop bar 52. Thus, the sanitary jacket SJ will be seated within the interior of the frozen dessert cone FDC so as to be ready to mate with the exterior handle portion of the next sequential frozen dessert cone FDC when the cones are stacked for purposes of packaging to be described later.

As noted previously, the transfer bar TB will continue to move towards the frozen dessert cone FDC being held stationary by the stop bar 52 during the time needed to position the sanitary jacket SJ within the interior of the cone handle H. Accompanying FIG. 8d thus shows the state of the cycle where the transfer bar TB has again contacted the trailing edge of the frozen dessert cone FDC so as to convey the same to the downstream packaging station PS (see FIG. 1). Just prior to renewed contact between the frozen dessert cone FDC and the transfer bar TB, however, the stop bar 52 is raised to its inoperative position (e.g, by reversing the air pressure supplied to air cylinder actuator 54) to thereby allow the frozen dessert cone FCD to proceed unimpeded to the product packaging station PS.

Upon reaching the product packaging station PS, the cones are stacked by nesting the cone handles H of downstream cones in the hollow handle interiors of upstream cones. As a result of this stacking, the sanitary jackets SJ are mated with the exterior surfaces of the handles H associated with the relative downstream frozen dessert cones FDC. Furthermore, the first (uppermost) frozen dessert cone in the stack will have a sanitary jacket placed within its interior by virtue of the operation of the jacketing apparatus 10 described previously which necessitates moving the last (bottommost) cone in the stack (which does not yet have a sanitary jacket mated to the exterior handle) such that its handle is nested with the uppermost (now second) cone in the stack. The net result will be that all of the frozen dessert cones in the stack will have a sanitary jacket mated on the exterior handle surface.

The procedure described above may be practiced due to the slight clearance space that is provided between the exterior cone handle H and the side wall of the sanitary jacket SJ which allows venting of any air that may be trapped. This slight clearance space is available during the time when the frozen dessert cones have minimal moisture content by virtue of the cooking process that has occurred a relatively short time period before the sanitary jackets are nested onto the cone handles. As a result of this low moisture content, the frozen dessert cones FDC will be in a slight dimensionally contracted state. Over time prior to consumption, however, the moisture content of the frozen dessert cones FDC will increase thereby causing the frozen dessert cones FDC to swell or dimensionally expand. It is this dimensional expansion which exerts a radial force outwardly against the walls of the sanitary jacket thereby making inadvertent slippage from the cone handle quite unlikely. However, the sanitary jacket SJ may readily be "peeled" from the cone handle by tearing the sanitary jacket walls at the appropriate time by the consumer.

The present invention thereby provides suitable solutions to several problems associated with conventional jacketed frozen dessert cones and the manner in which they are physically associated with the cone handles. Therefore, while the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of positioning sanitary jackets onto handles of open-top frozen dessert cones comprising the steps of:

sequentially conveying a number of frozen dessert cones along a selected conveyance path and in a selected conveyance direction such that the handles of the dessert cones are oriented in a downstream direction;

positioning a first frozen dessert cone at a jacketing station disposed along said conveyance path by directing a first pulse of pressurized air against said first frozen dessert cone to propel the same beyond a raised guide chute of the jacketing station and forwardly against a downstream stop such that conveyance of said first frozen dessert cone is temporarily halted by said stop with the open top of said first frozen dessert cone being oriented in an upstream direction;

aligning a sanitary jacket generally coaxially with the open top of the first frozen dessert cone by
(1) lowering the guide chute of the jacketing station so that a terminal end thereof is in the conveyance path at a position upstream of, and generally coaxially aligned with, the open end of said temporarily halted first frozen dessert cone,
(2) moving a sanitary jacket through said lowered and aligned guide chute, and then
(3) directing a second pulse of pressurized air against said sanitary jacket as it moves along said lowered and aligned guide chute to forcibly propel said sanitary jacket from said lowered and aligned guide chute and through said open top into a seated position within an interior region of the handle of said first frozen dessert cone; and then subsequently nesting a handle of a second frozen dessert cone within said first frozen dessert cone so that said sanitary jacket seated within said interior handle region of said first frozen dessert cone is mated with the nested handle of said second frozen dessert cone.

2. A method as in claim 1, wherein said step of positioning the first frozen dessert cone includes the steps of moving a stop bar into an obstructing position along said conveyance path, and then propelling the first frozen dessert cone forwardly along said conveyance path into abutment with said stop bar.

3. A method as in claim 1, wherein said step of aligning the sanitary jacket includes allowing a sanitary jacket to fall into the chute and be directed thereby to the interior region of the handle.

4. A method as in claim 3, wherein said step of aligning a sanitary jacket further includes providing a stack of said sanitary jackets and stripping a bottommost one of said sanitary jackets from the stack to allow it to fall into the chute under its own weight.

5. A method as in claim 4, wherein said step of stripping a bottommost one of said sanitary jackets includes counter-rotating a pair of strip rollers to cause a pair of friction members to come into contact with a bottommost sanitary jacket in the stack.

6. A method of positioning a sanitary jacket within an open-ended interior region of a hollow handle associated integrally with a frozen dessert cone comprising the steps of:
(i) directing a first pulse of pressurized air against a frozen dessert cone to propel said frozen dessert cone along a conveyance path with the open-ended interior region facing upstream and below a raised chute of a jacketing station,
(ii) temporarily halting advancement of said frozen dessert cone along said conveyance path at said jacketing station such that said temporarily halted frozen dessert cone is at a position downstream of said chute;
(iii) positioning a sanitary jacket within the interior region of the frozen dessert cone by (1) moving the chute of the jacketing station so that the chute is in the conveyance path of said cone at a position upstream of, and aligned with, the open-ended interior region of the temporarily halted frozen dessert cone, (2) positioning a sanitary jacket in the aligned chute, and then (3) directing a second pulse of pressurized air against the sanitary jacket in the chute to forcibly propel the sanitary jacket from the chute and into the open-ended interior region of the frozen dessert cone.

7. A method as in claim 6, which includes the steps of moving a stop bar into an obstructing position along said conveyance path, and then propelling said frozen dessert cone forwardly along said conveyance path and into abutment with said stop bar by directing said first pulse of pressurized air against said frozen dessert cone.

8. A method as in claim 6, wherein said step of positioning a sanitary jacket further includes providing a stack of said sanitary jackets and stripping a bottommost one of said sanitary jackets from the stack to allow it to fall into said guide chute under its own weight.

9. A method as in claim 8, wherein said step of stripping a bottommost one of said sanitary jackets includes counter-rotating a pair of strip rollers to cause a pair of friction members to come into contact with a bottommost sanitary jacket in the stack.

10. Apparatus for positioning a sanitary jacket within an open-ended interior region of a hollow handle associated integrally with a frozen dessert cone comprising:
(i) a conveyance path for conveying frozen dessert cones with the open-ended interior regions facing upstream;
(ii) a chute for guiding sanitary jackets;
(iii) a drive assembly connected to said chute for moving said chute relative to said conveyance path between a first position wherein a frozen dessert cone may pass thereby along said conveyance path, and a second position wherein an outlet end of said chute is disposed in said conveyance path upstream of, and generally aligned with, the open-ended interior region of a frozen dessert cone so as to guide a sanitary jacket toward the open-ended interior region of the frozen dessert cone;
(iv) a nozzle for directing a stream of air in the direction of the conveyance path; and
(v) a control system connected to said drive assembly and said nozzle for (1) causing the nozzle to issue a first pulse of air against the frozen dessert cone while the chute is in said first position to propel the cone forwardly along the conveyance path and into a position downstream of said chute, (2) moving the chute into said second position after the frozen dessert cone has been propelled forwardly along the conveyance path by said first pulse of air into said downstream position, and then (3) causing the nozzle to issue a second pulse of air against a sanitary jacket in the chute to responsively forcibly propel the sanitary jacket from said chute and into the interior region of the frozen dessert cone handle.

11. Apparatus as in claim 10, further comprising a stop bar against which the frozen dessert cone abuts so as to position the frozen dessert cone relative to an outlet end of the chute.

12. Apparatus as in claim 10, further comprising a sanitary jacket holder which is adapted to hold a stack of said sanitary jackets, and a stripping mechanism for stripping a bottommost one of the sanitary jackets from the stack.

13. Apparatus for positioning sanitary jackets onto handles of open-top frozen dessert cones comprising:
a transfer conveyer for sequentially conveying a number of frozen dessert cones along a selected conveyance path and in a selected conveyance direction such that the handles of the dessert cones are oriented in a downstream direction;

a jacketing station disposed along the conveyance path which includes a guide chute for guiding sanitary jackets;

a stop bar for locating a first one of said frozen dessert cones along said conveyance path at a position which is downstream of said guide chute such that the open top of said first frozen dessert cone is oriented in an upstream direction;

a nozzle for directing a stream of pressurized fluid along said conveyance direction;

a drive assembly connected to said guide chute for moving said guide chute relative to said conveyance path between a raised position wherein said first frozen dessert cone may pass therebelow along said conveyance path, and a lowered position wherein an outlet end of said chute is in said conveyance path and is generally aligned with the open top of said first frozen dessert cone at said downstream position thereof so as to guide a sanitary jacket toward the interior region of said first frozen dessert cone; and a control system connected to said drive assembly and said nozzle for (1) causing the nozzle to issue a first pulse of air against the first frozen dessert cone while said guide chute is in said raised position to propel the first frozen dessert cone forwardly along the conveyance path and into said downstream position thereof, (2) moving said guide chute from said raised position and into said lowered position after the first frozen dessert cone has been propelled forwardly along the conveyance path by said first pulse of air into said downstream position thereof, and then (3) causing the nozzle to issue a second pulse of air against a sanitary jacket in said guide chute to responsively forcibly propel the sanitary jacket from said guide chute and into the interior region of the first frozen dessert cone handle, whereby a handle of a second frozen dessert cones may be inserted within said first frozen dessert cone so that said sanitary jacket seated within said interior handle region of said first frozen cone is mated with an exterior surface of the handle of said second dessert cone.

14. Apparatus as in claim 13, wherein said stop bar is movable between an obstructing position along said conveyance path wherein frozen dessert cones abut against and are halted by said stop bar, and a non-obstructing position wherein frozen dessert cones may pass therebeneath along the conveyance path, and wherein said control system is connected to said stop bar to move the same into said obstructing position such that said first pulse of air propels said first frozen dessert cone forwardly along said conveyance path and into abutment with said stop bar.

15. Apparatus as in claim 13, further comprising a sanitary jacket supply system for introducing a sanitary jacket into the chute to be directed thereby to the interior region of the handle.

16. Apparatus as in claim 15, wherein said sanitary jacket supply system further includes a holder for holding a stack of said sanitary jackets and a stripper for stripping a bottommost one of said sanitary jackets from the stack to allow it to fall into the chute under its own weight.

17. Apparatus as in claim 16, wherein said stripper includes a counter-rotating pair of strip rollers having respecting friction members which contact a bottommost sanitary jacket in the stack thereby stripping the same from the stack.

18. A system for making sanitary-jacketed frozen dessert cones including a cooking oven for cooking raw batter in the form of open-ended frozen dessert cones, a transfer conveyor for conveying the cooked frozen dessert cones from the cooking oven along a conveyance path such that the open ends of said frozen dessert cones are oriented in an upstream direction, and a jacketing station disposed along the conveyance path, wherein said jacketing station comprises:

(i) a chute for guiding sanitary jackets;

(ii) a drive assembly connected to said chute for moving said chute relative to said conveyance path between a first position wherein a frozen dessert cone may pass thereby along said conveyance path, and a second position wherein an outlet end of said chute is in said conveyance path at a position upstream of, and generally aligned with, the open end of a frozen dessert cone so as to guide a sanitary jacket toward the open end of the frozen dessert cone and into an interior region thereof;

(iii) a nozzle for directing a stream of air in the direction of the conveyance path; and (iv) a control system connected to said drive assembly and said nozzle for (1) causing the nozzle to issue a first pulse of air against the frozen dessert cone while the chute is in said first position to propel the cone forwardly along the conveyance path and into a position downstream of said chute, (2) moving the chute into said second position after the frozen dessert cone has been propelled forwardly along the conveyance path by said first pulse of air into said downstream position thereof, and then (3) causing the nozzle to issue a second pulse of air against a sanitary jacket in the chute to responsively forcibly propel the sanitary jacket from said chute and into the interior region of the frozen dessert cone handle.

19. A system as in claim 18, further comprising a fan station disposed along the conveyance path for cooling the frozen dessert cones.

20. A system as in claim 18, further comprising an inversion mechanism disposed upstream of the jacketing station for inverting incorrectly oriented frozen dessert cones.

* * * * *